United States Patent
Barwicz et al.

(10) Patent No.: US 7,450,800 B2
(45) Date of Patent: Nov. 11, 2008

(54) PRECISE AND PERMANENT MODIFICATION OF THE RESONANT FREQUENCY OF A DIELECTRIC MICROCAVITY AND CORRECTION OF FREQUENCY SHIFTS IN DIELECTRIC COUPLED-RESONATOR FILTERS

(75) Inventors: Tymon Barwicz, Cambridge, MA (US); Michael R. Watts, Albuquerque, NM (US); Milos Popovic, Somerville, MA (US); Christina Manolatou, Ithaca, NY (US)

(73) Assignee: Massachusetts Institute of Technology, Cambridge, MA (US)

( * ) Notice: Subject to any disclaimer, the term of this patent is extended or adjusted under 35 U.S.C. 154(b) by 74 days.

(21) Appl. No.: 11/372,643

(22) Filed: Mar. 10, 2006

(65) Prior Publication Data

US 2006/0245693 A1 Nov. 2, 2006

Related U.S. Application Data

(63) Continuation of application No. 11/353,538, filed on Feb. 14, 2006, now Pat. No. 7,343,067, which is a continuation of application No. PCT/US2004/028859, filed on Sep. 7, 2004.

(60) Provisional application No. 60/500,801, filed on Sep. 5, 2003.

(51) Int. Cl.
*G02B 6/26* (2006.01)
*G02B 6/42* (2006.01)
*H01S 3/08* (2006.01)
*H01S 3/081* (2006.01)
*H01S 3/083* (2006.01)
*H01L 21/00* (2006.01)

(52) U.S. Cl. ............... 385/32; 385/31; 385/39; 385/50; 372/92; 372/93; 372/94; 438/27; 438/29; 438/31; 438/69; 438/71

(58) Field of Classification Search ............ 385/32
See application file for complete search history.

(56) References Cited

U.S. PATENT DOCUMENTS

| 5,393,987 A | 2/1995 | Abboud et al. | |
|---|---|---|---|
| 2002/0039470 A1* | 4/2002 | Braun et al. | 385/50 |
| 2002/0094150 A1* | 7/2002 | Lim et al. | 385/15 |
| 2004/0008942 A1* | 1/2004 | Scheuer et al. | 385/39 |

FOREIGN PATENT DOCUMENTS

| WO | WO 00/50938 | 8/2000 |
|---|---|---|
| WO | WO 02/25338 | 9/2002 |

OTHER PUBLICATIONS

Suzuki et al., "Integrated-Optic Double-Ring Resonators with a Wide Free Spectral Range of 100 GHz," 8217 Journal of Lightwave Technology, vol. 13, No. 8, Aug. 1995, pp. 1766-1771.

Little et al., "Microring Resonator Channel Dropping Filters," Journal of Lightwave Technology, vol. 15, No. 6, Jun. 1997, pp. 998-1005.

* cited by examiner

*Primary Examiner*—Frank G Font
*Assistant Examiner*—Ryan Lepisto
(74) *Attorney, Agent, or Firm*—Gauthier & Connors LLP

(57) ABSTRACT

A coupled resonator includes a plurality of resonators such that at least one of the resonators is modified so as to adjust the resonant frequency associated with the coupled resonator.

12 Claims, 9 Drawing Sheets

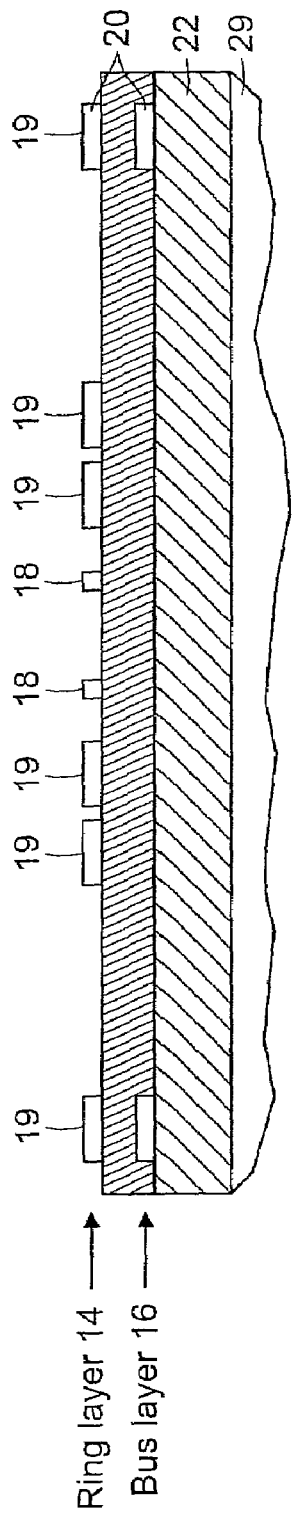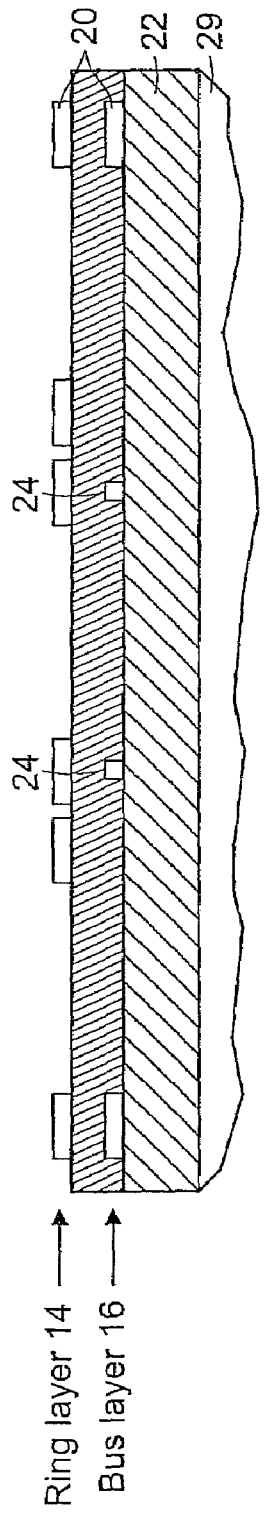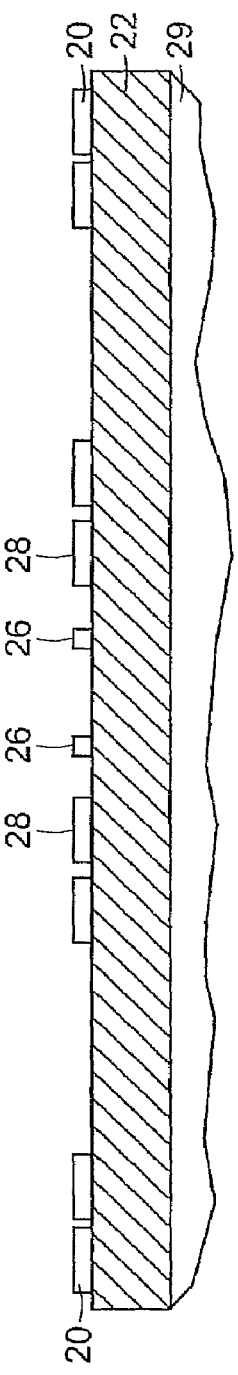

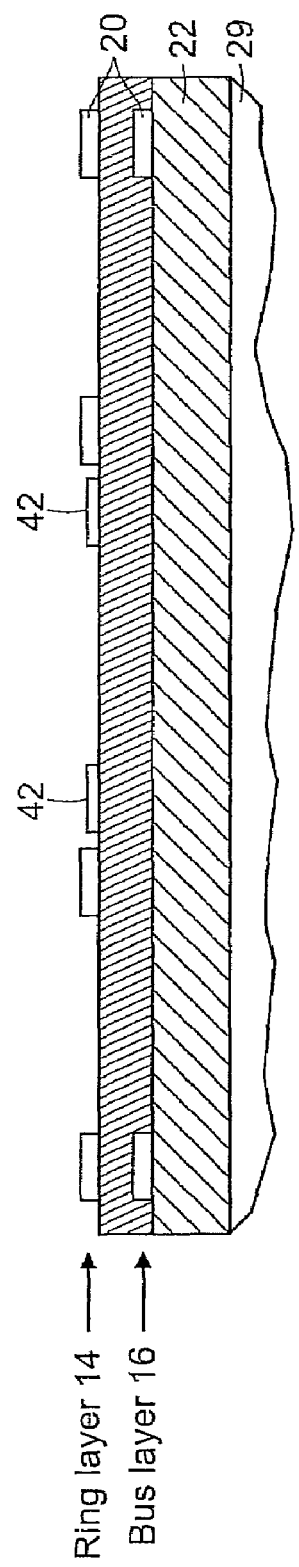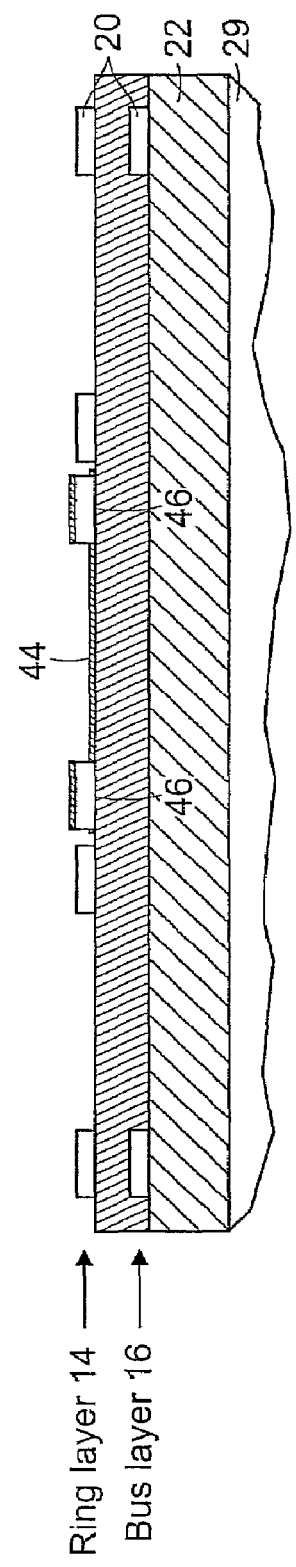

PRECISE AND PERMANENT MODIFICATION OF THE RESONANT FREQUENCY OF A DIELECTRIC MICROCAVITY AND CORRECTION OF FREQUENCY SHIFTS IN DIELECTRIC COUPLED-RESONATOR FILTERS

PRIORITY INFORMATION

This application is a continuation of U.S. patent application Ser. No. 11/353,538 filed on Feb. 14, 2006, now U.S. Pat. No. 7,343,067 which is a continuation of PCT Application No. PCT/US2004/028859, filed Sept. 7, 2004, which claims priority to U.S. Provisional Application Ser. No. 60/500,801, filed Sep. 5, 2003.

BACKGROUND OF THE INVENTION

The invention relates to the field of dielectric microcavities and in particular to precise and permanent modification of the optical resonant frequency of a dielectric microcavity.

Dielectric microcavities are used to create a wide range of compact optical filters. Filters are usually created by coupling dielectric microcavities with the same uncoupled optical resonant frequencies. A variety of filter responses can be created in this fashion. Of particular interest are optical channel add-drop filters that are part of optical add-drop multiplexers (OADMs), key components of modern optical telecommunication networks.

SUMMARY OF THE INVENTION

According to one aspect of the invention, there is provided an optical filter that includes a plurality of coupled resonators wherein at least two optical coupled resonators have different uncoupled resonant frequencies.

According to another aspect of the invention, there is provided a plurality of dielectric microcavities where a permanent resonant frequency alteration has been introduced to at least one of the said dielectric microcavity.

According to another aspect of the invention, there is provided a coupled resonator comprising a plurality of resonators such that at least one of said resonators is permanently modified so as to adjust its resonant frequency.

According to yet another aspect of the invention, there is provided a method of designing an optical filter that includes a plurality of coupled resonators wherein at least two optical coupled resonators have different uncoupled resonant frequencies.

According to yet another aspect of the invention, there is provided a method of introducing a permanent alteration of the resonant frequency of a dielectric microcavity comprising a plurality of dielectric microcavities.

According to yet another aspect of the invention, there is provided a method of permanently modifying a coupled resonator comprising a plurality of coupled resonators so as to adjust its resonant frequency.

BRIEF DESCRIPTION OF THE DRAWINGS

FIGS. 4A-4D are schematic diagrams demonstrating matching resonant frequency of resonators by addition of non-resonant structures;

FIGS. 6A-6B are schematic diagrams of another embodiment demonstrating post-fabrication frequency trimming by adding or removing material.

DETAILED DESCRIPTION OF THE INVENTION

Coupled dielectric resonators are used to create compact microphotonic filters. The dielectric resonator is usually a ring, a racetrack, a quarter-wave shifted grating or another type of dielectric microcavity. These filters are commonly designed by using resonators with identical uncoupled resonant frequencies (prior art). An uncoupled resonant frequency is the frequency experienced by a resonator when it isolated from its environment (isolated from any other dielectric structure such as waveguides and resonators). As the first embodiment of this invention, it is stated that these filters should be designed with resonators of different uncoupled resonator frequencies to take into account the mostly repeatable frequency shifts that occur when the resonators are coupled to their environment and the mostly repeatable frequency shifts coming from the fabrication process.

Precise modification of the resonant frequency of a resonator is usually done by employing impermanent mechanisms like thermal tuning or carrier injection tuning (prior art). These mechanisms require power consumption and a control circuit. In many cases a permanent modification is favored. In prior art, permanent mechanisms such as global thin film deposition, global etching, stress introduction and the photorefractive effect have been employed to tune the center frequency of complete filters and hence to mostly equally modify the resonances of all resonators forming the filter. In addition, stress induction and the photorefractive can only introduce small changes in resonant frequency. It is important to note that only thermal tuning has been used in prior art to change the resonant frequency of an individual resonator of a high-order filter. All the other mechanisms were employed to change the center frequency of a complete optical filter and not of its individual components. Fabrication techniques to introduce precise and permanent modifications of resonant frequencies of individual dielectric microcavities are presented in this invention. These techniques can be applied to individual resonators within a high-order filter and to single resonators coupled to waveguides. Introducing precise and permanent modifications to the resonant frequency of a dielectric resonator is a difficult problem, whose solutions are necessary in fabrication of filters formed of resonators with slightly different uncoupled resonant frequencies and for other applications. The importance of correcting frequency shifts will first be discussed. Then, the fabrication techniques forming the other embodiments of the invention will be presented.

In filter response synthesis, precise control of the resonance frequencies and mutual couplings is required. Herein, a frequency shift in a resonator is identified as an effect that can hinder the realization of the desired response if left uncompensated. A frequency shift can originate from different phenomena that will now be described.

Figure 1B:
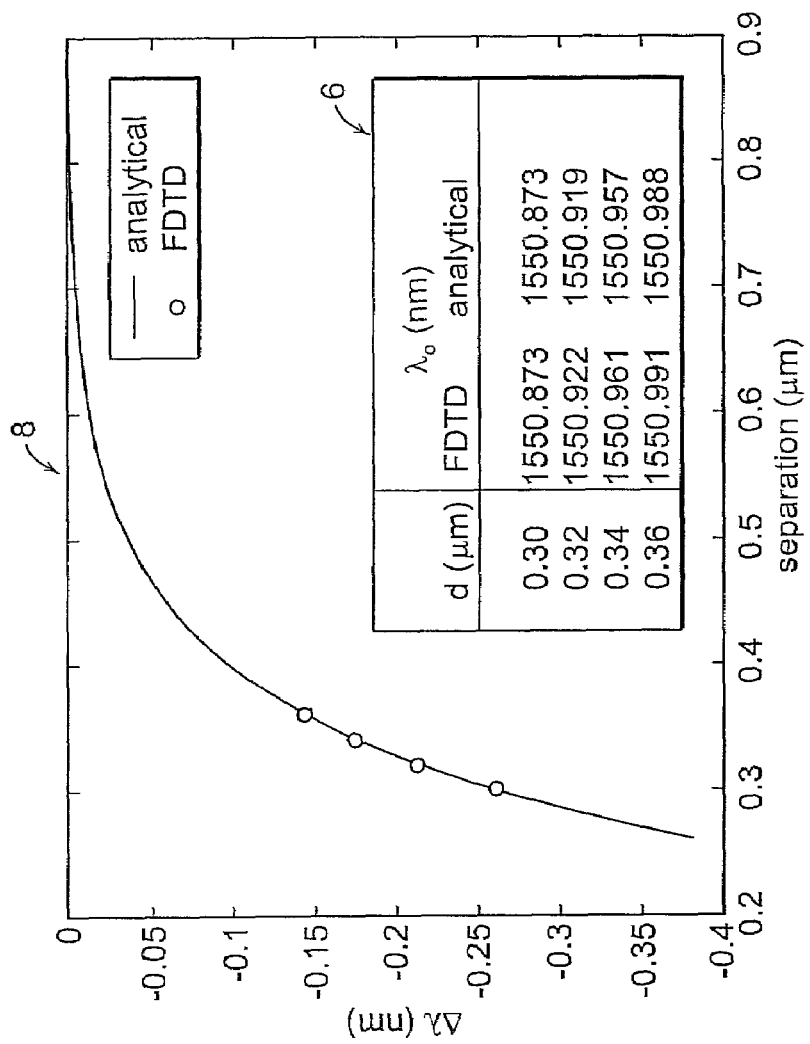
FIGS. 1A-1B illustrates an FDTD simulation of coupling-induced frequency shift in a dielectric microcavity.
Figure 1A:
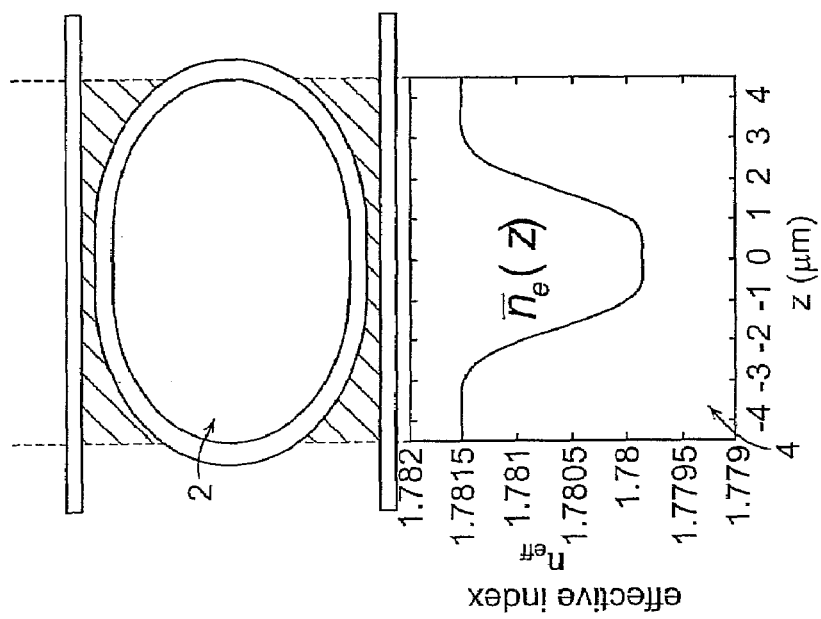

First, a coupling-induced frequency shift (CIFS) is due to the perturbation of a resonant mode, via the index of an external coupled structure that altering the resonant frequency. This is a purely optical effect and has nothing to do with the fabrication process employed. This frequency shift can be negative or positive depending on the dominant of several contributing effects. For a resonator perturbed by a nearby dielectric object with no relevant modes of its own, the CIFS is negative for a positive index perturbation. This is an intuitive result if one considers the wave equation, or its stationary integral for frequency: a positive refractive index perturbation is introduced, so the frequency must decrease. In the case of adjacent evanescently-coupled resonators, however, the basis of modes employed to understand the coupled resonator is normally not orthogonal. A second, positive CIFS contribution then arises due to the shared cross-energy of the modes and the net CIFS could be found to be positive. Other contributions arise form deformations in the mode field pattern due to the index perturbation. An exemplary 2D FDTD simulation 4 of a single TE racetrack resonator 2 (L=34.6 µm) add/drop filter in which the unintuitive positive CIFS was first observed is shown in FIG. 1A. The free-running frequency is found as 1551.134 nm, but under coupling to two bus waveguides it shifted to values given in the table 6 in FIG. 1B, resulting in a positive CIFS of up to +30 GHz or −0.25 nm. Also, FIG. 1B shows the results 8 of an analytical model of the frequency shift.

Other mostly repeatable resonant-frequency shifts appear during the fabrication of the filter. Several fabrication effects may alter the dimensions of a resonator and, thus, its resonant frequency. A partial list of these effects is:

proximity effects,
intra-field distortion,
charging effects,
non-perfect planarization,
non-uniform etching,
non-uniform material deposition.

It should be noted that some of this fabrication effects may alter the refractive index of the resonator and not necessarily the resonator's dimensions. Such an alteration will also result in a frequency shift of the resonator.

Figure 2:
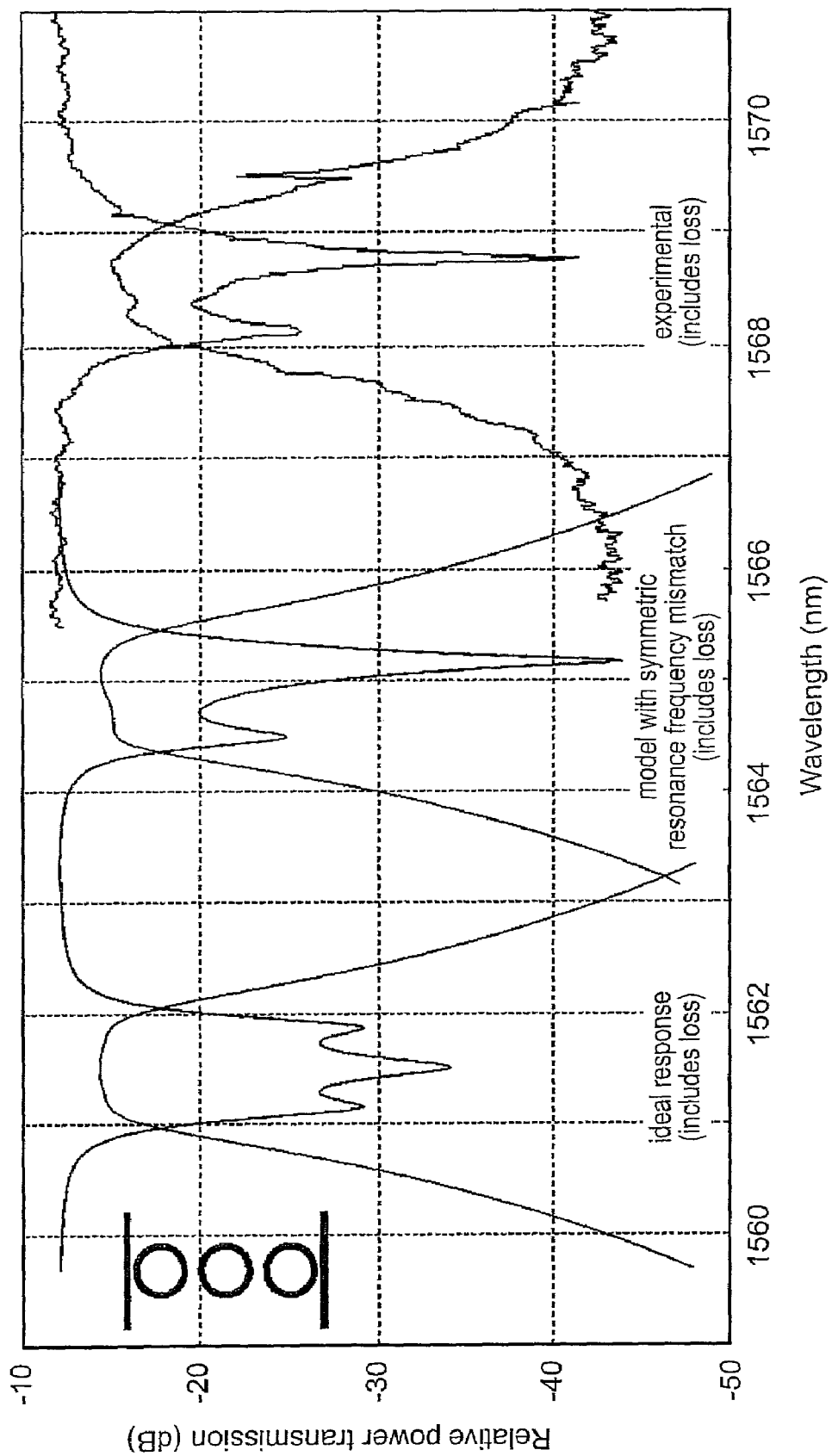
FIG. 2 is a graph illustrating typical drop and thru port frequency responses of a 3rd-order filter using identical microrings using concepts of the invention.

While the impact of a frequency shift on a single-resonator filter is a simple displacement in frequency of the spectral response, the impact of a frequency shift on higher-order filters is more serious. The effect of non-degenerate resonant frequencies is shown in FIG. 2 for a 100 GHz-wide series-coupled third-order microring-resonator-based Chebyshev (0.2 dB ripple) add/drop filter model. The plot shows an ideal response with ring loss included, but no frequency shift; and the same filter with a +20 GHz frequency shift in the middle microring. A significant degradation of the thru-port rejection is seen. In addition, the drop spectrum acquires a slight asymmetry and ripple. Also, FIG. 2 shows the measured spectral response of a series-coupled third-order microring resonator based add/drop filter fabricated in SiN by electron-beam lithography that experimentally demonstrates the existence of such frequency shifts and their deleterious effects. Note that neither an asymmetric coupling nor ring loss distribution can account for an asymmetric spectrum such as the one shown in FIG. 2.

To correct for the frequency shift, one needs to adjust the optical resonance frequencies of the resonators. The first embodiment of the invention is now re-stated. The frequencies need to be pre-distorted by the amount of expected frequency shifts. Hence, for better performance, coupled-dielectric resonator filters should be designed with resonators of different uncoupled resonator frequencies to take into account the CIFS and other mostly repeatable frequency shifts.

To adjust or pre-distort the resonant frequency, one needs to change the optical path length in the resonator. In general, it means changing the physical path length or the effective index of the resonator. The physical path length is modified by changing the resonator dimensions along the direction of light propagation. On the other hand, the effective index is modified by changing the material optical properties or the dimensions transversal to light propagation. For instance, in the case of a ring resonator, the physical, path length corresponds to the circumference of the ring and the effective index corresponds to the propagation constant in the waveguide defining the ring. The propagation constant depends on the refractive indices of the materials used and on the cross-section (shape and dimensions) of the waveguide.

There are numerous ways of correcting the resonant frequency. The best approach will usually depend on the fabrication tools available and on the fabrication process used. A series-coupled third-order microring resonator will be used for practical examples. It will be appreciated that the proposed solutions are not limited to third-order microring resonators. They can be applied to any dielectric microcavity. For instance, the particular resonator could be a ring, a racetrack or a quarter-wave shifted grating.

The easiest and the most economical solution will most often be scaling the resonators in need for frequency trimming. For ring resonators, a small change in the circumference of the microring or the width of the waveguide is required. The main difficulty is to precisely control the correction as the dimensional change needed is often on the order of a couple of nanometers. The invention presents a way to introduce such modifications in practice.

The second embodiment of the invention is particularly useful if maskless lithography is used. By maskless lithography, one means any lithography that does not use a mask such as scanning electron-beam lithography (SEBL), focused ion-beam lithography or zone plate array lithography. In such techniques, the pixel size is often much bigger than a nanometer. Hence, to precisely trim the resonant frequency, one needs to use dimensional changes resultant from dose changes. A higher dose will create slightly larger features. On a microring resonator, a higher dose will change the width of the waveguide and hence the inner and outer radius of the microring. This will modify the resonant frequency by simultaneously changing the effective index and the physical path length through the resonator (the outer radius being where most of the guided light travels).

Figure 3A:
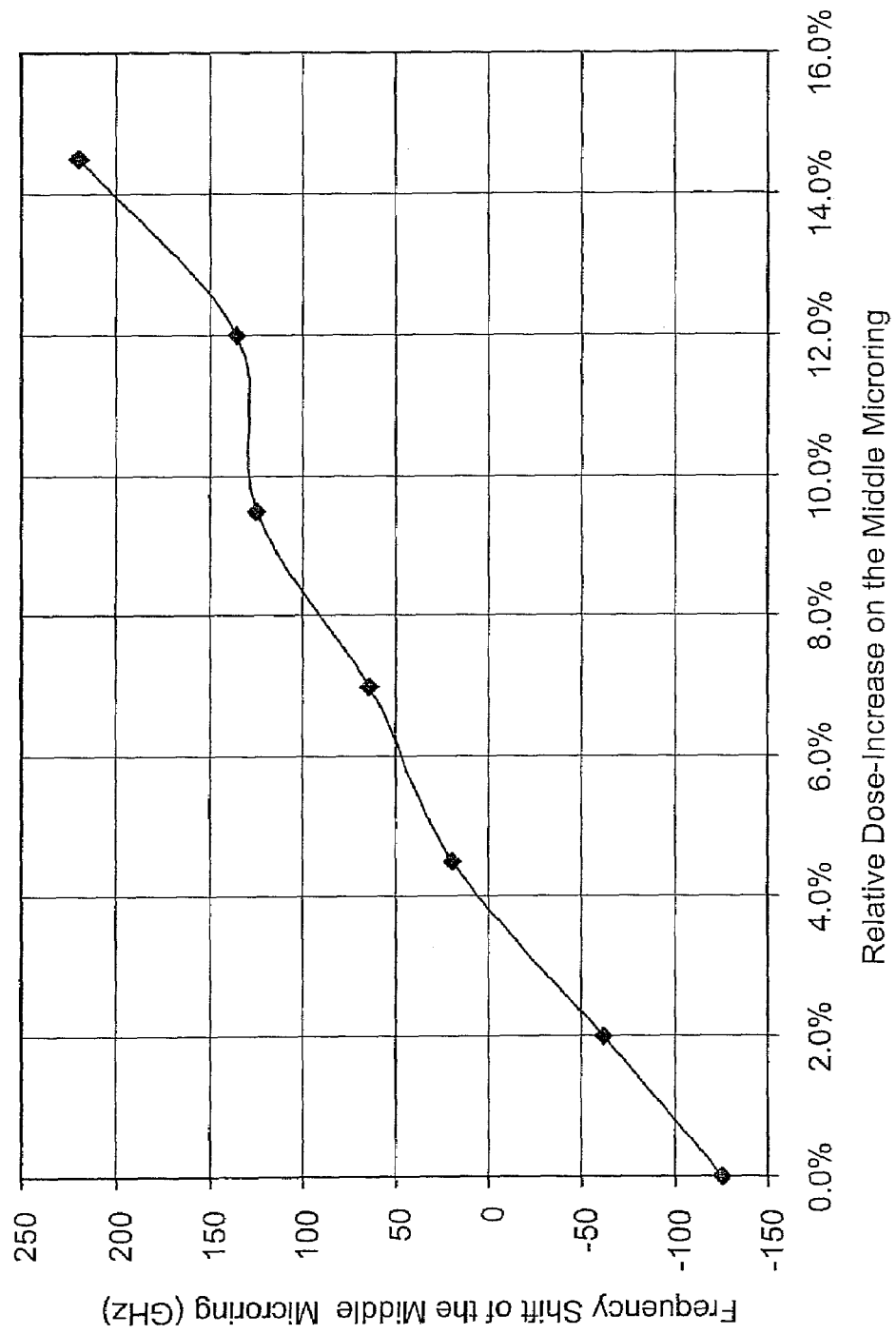
FIG. 3A is a graph presenting the experimental demonstration of the modification of the resonant frequency of a dielectric microcavity with dimensional changes introduced by changing the lithographic-exposure-dose associated with the dielectric microcavity.

FIG. 3A shows the experimental demonstration of frequency correction by dose variations introduced to a middle ring resonator of a third-order series-coupled microring filter fabricated by SEBL. The relative dose increase on the middle microring is expressed in function of the outer rings dose. The dose increase created a displacement of the edge of the 800-nm-wide waveguide defining the microring with an 8-micron outer radius. The dose can easily be controlled to within, for instance, $\frac{1}{10}^{th}$ of one percent, which illustrate the power and precision of this correction technique. In this particular example, the difference between the frequency shifts experienced by the inner ring and the outer rings before dose compensation is 126 GHz. Out of this total frequency shift difference, 42 GHz is due to the CIFS and the remaining 84 GHz comes from the fabrication process. A 3.9% dose increase on the inner ring offers the best inner ring resonant frequency correction in this particular example.

Figure 3B:
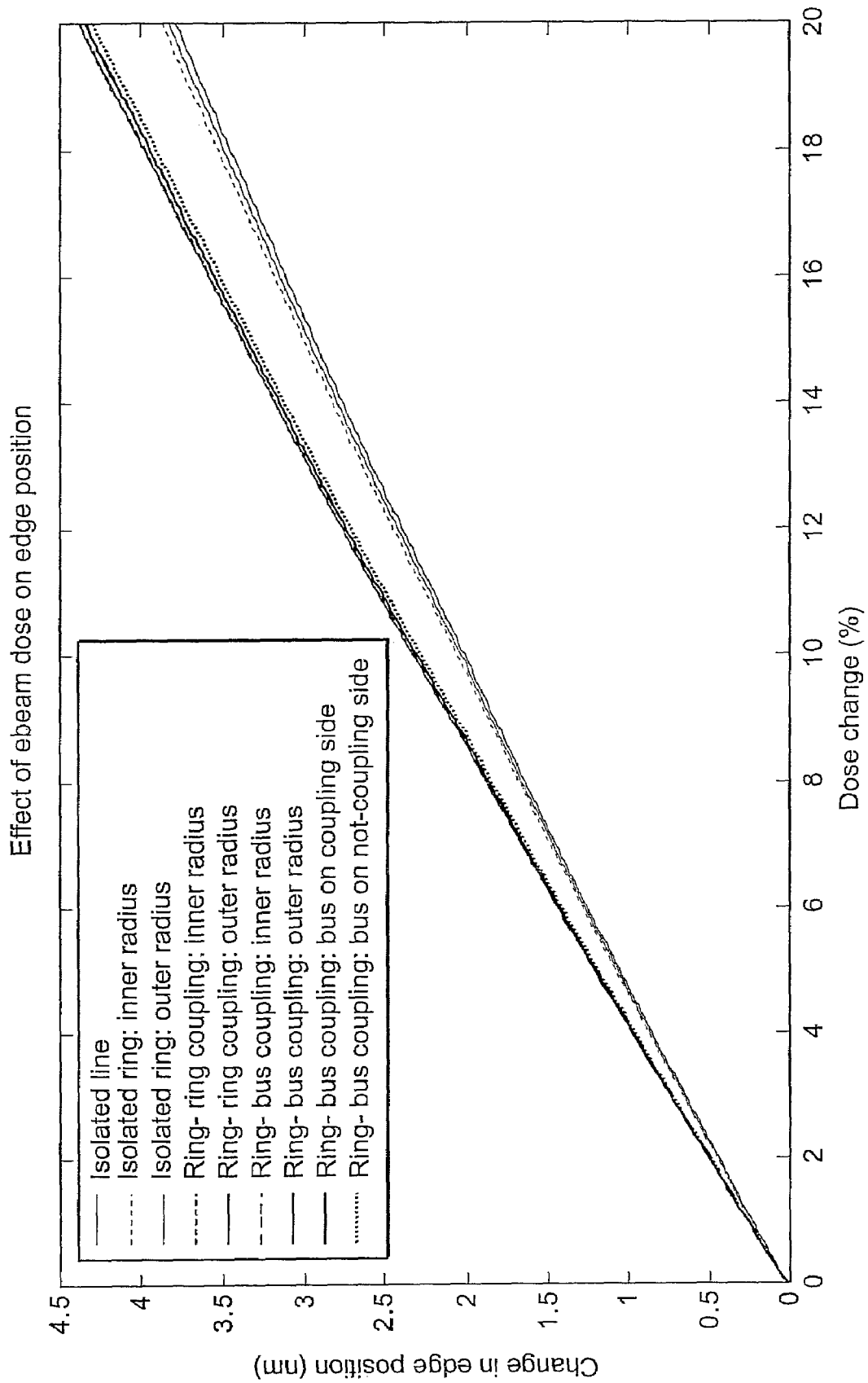
FIGS. 3B-3C are graphs demonstrating dimensional changes introduced by changing the dose" is fine in the brief description of the drawings.
Figure 3C:
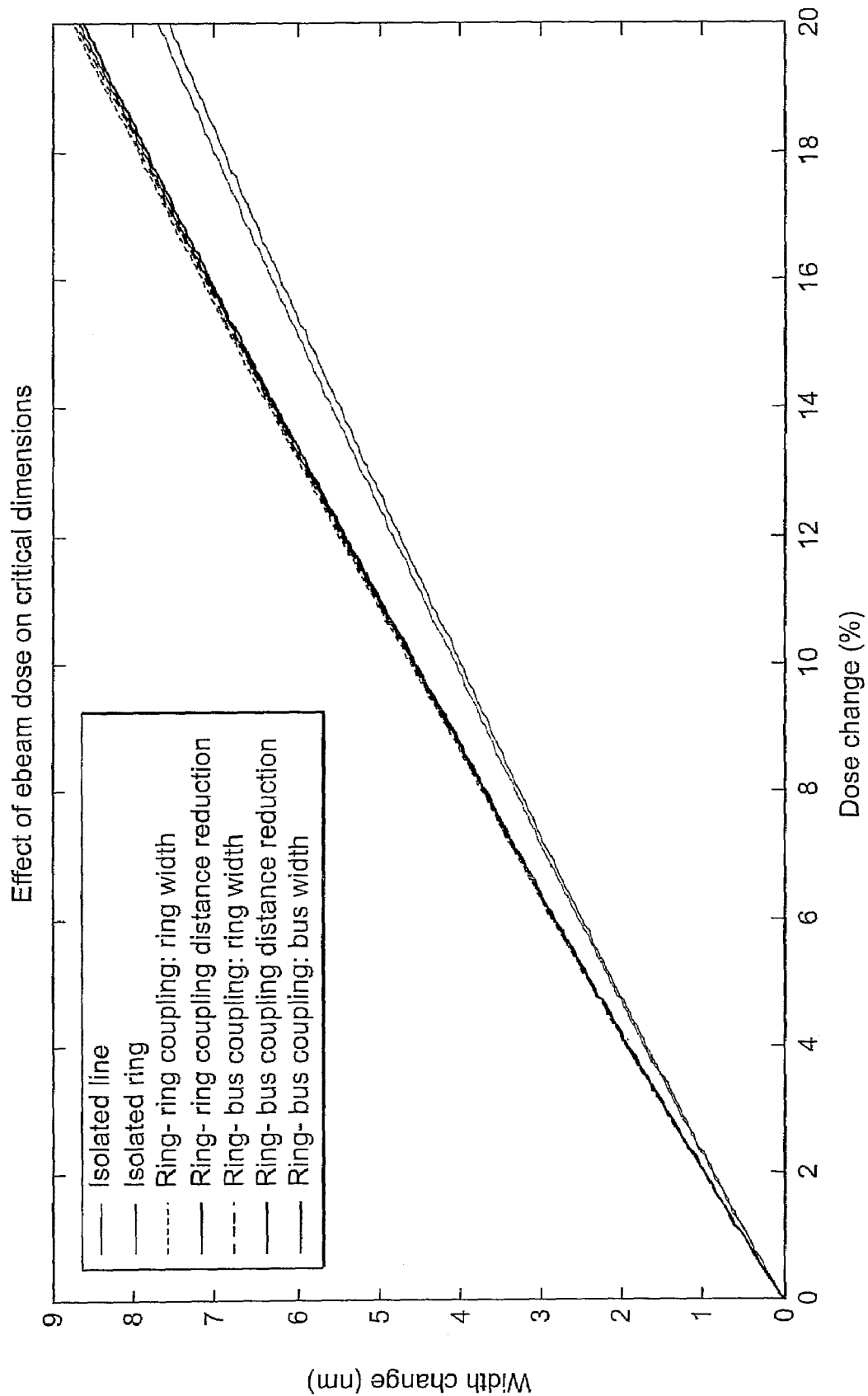

FIG. 3B-3C illustrates dimensional changes introduced to a ring resonator by changing the dose in SEBL. In particular, FIG. 3B shows the displacement of the edge for 800-nm-wide waveguides defining rings with an 8-micron outer radius at different positions in the filter. FIG. 3C shows the difference introduced by the dose change in some critical dimensions.

The third embodiment of this invention is particularly useful when the previous embodiment cannot be applied directly. This will be the case if conventional lithography is used. By conventional lithography, one means any lithography using a mask such as photolithography, extreme-UV lithography, imprint lithography or x-ray lithography. Precise dimensional changes need to be introduced in the mask. This can be done during mask making by using the dose change described above. Alternatively, a dose change can not be necessary as most of the projection systems employ a mask to chip reduction of about 4 to 5 times. Then, the pixel size of the maskless lithography system employed for mask fabrication is effectively reduced on the chip by the mask-to-chip reduction factor. Hence, modifying a cavity dimensions by a pixel or more on the mask may provide a sufficiently precise correction.

If scaling the resonators is impractical, a small change in the effective index of the resonator can be introduced by adding non-resonant structures. By modifying the transverse mode distribution by overlapping the mode of the resonator with a non-resonant structure, the effective index of the resonator can be corrected. For ring resonators, a secondary non-resonant ring is necessary. The location of this non-resonant structure depends mainly on lithographic resolution. The most economical solution will usually not require adding additional layers to the structure. FIG. 4A-4D shows how it can be implemented in third-order ring resonators to correct the frequency shift of the middle microring. It is important to note that this embodiment of the invention is very different from the prior art where the index of the cladding is slightly modified to change the resonant frequency of a micro-ring resonator. In this invention, dielectric structures are introduced lithographically and permanently. The cladding index is not used for the resonant frequency modification.

Figure 4A:
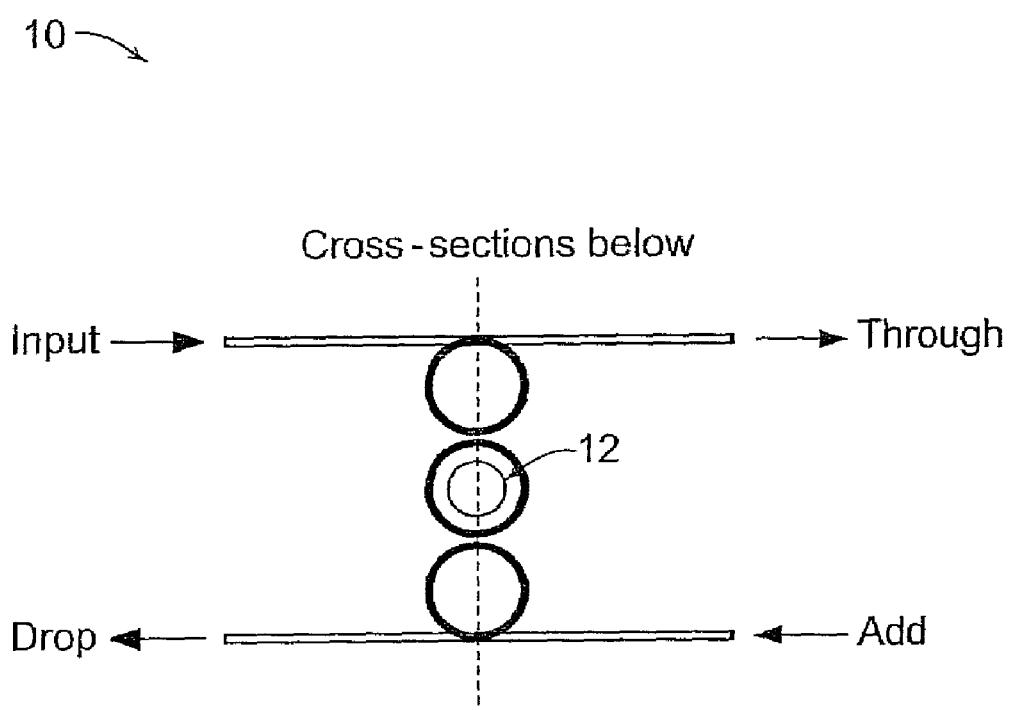

FIG. 4A illustrates a top view of a third-order ring resonator 10 with a secondary ring in the middle 12. FIG. 4B shows the cross-section of a third-order ring resonator 10 with a substrate 29, vertical bus-to-ring coupling, and a secondary ring 18 at the ring layer 14. Both the ring layer 14 and bus layer 16 include high 20 and low index 22 layers. Note the secondary ring layer 18 is formed on the ring layer 14 but in other embodiments shown in FIG. 4C the secondary ring layer can be formed in the bus layer 16. Note in a multilayer implementation, where the bus waveguides are on a different layer than the rings, it may be more practical to include the perturbing structure on the bus level since both the CIFS and the correcting frequency shift introduced by the secondary ring 24 are then dependent on the separation between the ring 14 and bus layer 16, as shown in FIG. 4C. For a single layer filter, a secondary ring 26 can be added to the interior of middle ring 28 to lower its frequency, as shown in FIG. 4D. Other implementations on this general theme are certainly possible.

Figure 5A:
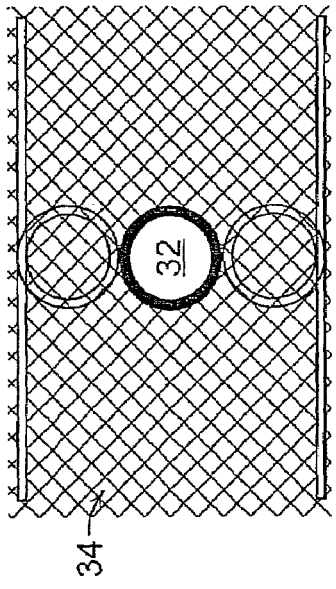
FIGS. 5A-5B are schematic diagrams demonstrating post-fabrication frequency trimming by adding or removing material.
Figure 5A:
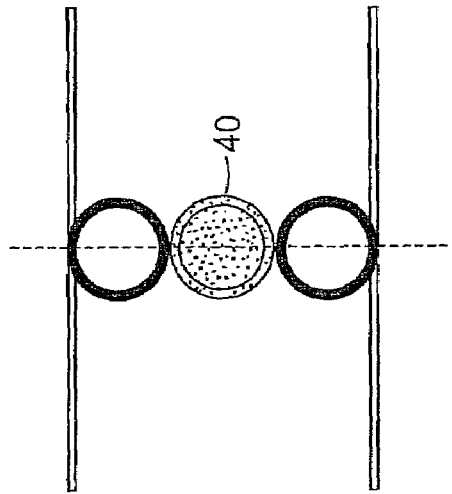
Figure 5B:
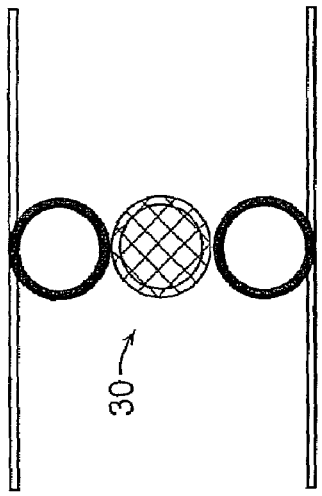
Figure 5B:
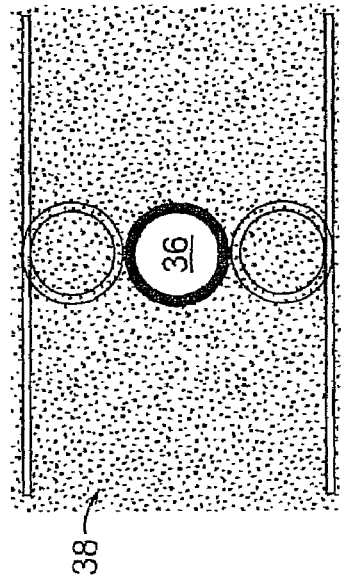

The forth embodiment of this invention is particularly useful when a resonance modification is needed after the resonator was fabricated. In some cases, the most practical solution may be to modify the resonator after it has been fabricated. For instance, a resonator can be corrected after a measurement of the exact frequency shift was made, or the next fabricated resonators could be corrected even if the same mask is used. The resonant frequency of a given resonator will be corrected by slightly removing or adding material. This will change the effective index of the resonator. A technique for modifying the central frequency of complete filters by adding and removing material has already been presented in prior art (Lim et al., MIT). In this embodiment of the invention a more powerful technique that allows one to modify the resonance frequencies of individual resonators coupled to other resonators within a higher-order filter is proposed. This invention allows to correct for frequency shifts, which the technique already known in prior art cannot provide. The selective modification of a subset of resonators within a high-order filter is created by first lithographically defining the area where the resonator to be modified is present. Hence, the region to be altered needs first to be defined by aligned lithography, as shown in FIG. 5A. Note that either the region encompassing the whole filter structure 34 except the resonator to be modified 32 or the region encompassing the resonator to be modified 30 alone need to be lithographically outlined. Then, a dielectric material can be deposited and lifted off, as shown in FIG. 5B. Either the dielectric material can be added to the whole resonator structure 38 except the middle ring structure 36 or to the middle ring to be modified 40 alone. Alternatively, a shallow etch can be performed on the lithographically defined area. If the resonator is a buried ring or racetrack, its resonant frequency can also be raised by etching a hole in the middle or on the top of the resonator. Note that these techniques are particularly useful if they correct already fabricated resonators but can also be implemented within a standard fabrication scheme.

FIGS. 6A-6B illustrate in cross-section the post-fabrication frequency trimming by adding or removing material in a lithographically defined region of a third-order filter with vertical bus-to-ring coupling with modification of the middle ring only. Note this arrangement is similar to the arrangement shown in FIG. 4A but the frequency trimming is obtained by directly modifying the resonator instead of adding non-resonant dielectric structures. FIG. 6A shows frequency matching by a shallow etch of the secondary ring 42. FIG. 6B shows frequency matching by deposition of a thin dielectric layer 44 on the middle ring 46.

Although the present invention has been shown and described with respect to several preferred embodiments thereof, various changes, omissions and additions to the form and detail thereof, can be made therein, without departing from the spirit and scope of the invention.

What is claimed is:

1. A method of modifying the resonant frequency of a microcavity comprising:

providing a plurality of dielectric microcavities; and introducing a permanent resonant frequency alteration to at least one of the said dielectric microcavity, wherein the permanent resonant frequency alteration has been introduced to at least one of the said dielectric microcavity by lithographically forming a secondary dielectric structure within the optical evanescent field of the said microcavity, said secondary dielectric structure does not come into contact with any of said dielectric microcavities; wherein at least one of the said dielectric microcavities is a dielectric waveguide in a closed loop forming a traveling wave resonator; wherein the said secondary dielectric structure is formed along the dielectric waveguide but not in contact with the dielectric waveguide; the secondary dielectric structure being non-guiding for optical frequencies below the cutoff frequency of the second transverse electric (TE) mode of the dielectric waveguide; and the secondary dielectric structure being positioned along the dielectric waveguide as to create a substantially equal perturbation of the evanescent field of the first TE mode of the dielectric wave guide, along the dielectric waveguide.

2. The method of claim 1, wherein at least two of the said dielectric microcavities are substantially similar traveling wave resonators formed of substantially similar dielectric waveguides, each of the said dielectric waveguides being arranged in a closed loop; wherein the said secondary dielectric structure is formed along the first of the at least two substantially similar dielectric waveguides but not in contact with any of the said dielectric waveguides; the secondary dielectric structure being non-guiding for optical frequencies below the cutoff frequency of the second transverse electric (TE) mode of the first dielectric waveguide; the secondary dielectric structure being positioned along the first dielectric waveguides as to create a substantially equal perturbation of the evanescent field of the first TE mode of the first dielectric waveguides along the said first dielectric waveguides.

3. The method of claim 2, wherein the said secondary dielectric structure is defined from the same material layer as at least one of the said at least two substantially similar dielectric waveguides.

4. The method of claim 1 wherein at least two of the said dielectric microcavities are substantially similar traveling wave resonators formed of substantially similar dielectric waveguides, each of the said dielectric waveguides being arranged in a closed loop comprising:

a first of said at least one secondary dielectric structure is formed along the first of the at least two substantially similar dielectric waveguides but not in contact with any of the said dielectric waveguides; the first secondary dielectric structure being non-guiding for optical frequencies below the cutoff frequency of the second transverse electric (TE) mode of the first dielectric waveguide; the first secondary dielectric structure being positioned along the first dielectric waveguides as to create a substantially equal perturbation of the evanescent field of the first TE mode of the first dielectric waveguides along the said first dielectric waveguides;

a second of said at least one secondary dielectric structure is formed along the second of the at least two substantially similar dielectric waveguides but not in contact with any of the said dielectric waveguides; the second secondary dielectric structure being non-guiding for optical frequencies below the cutoff frequency of the second TE mode of the second dielectric waveguide; the second secondary dielectric structure being positioned along the second dielectric waveguide as to create a substantially equal perturbation of the evanescent field of the first TE mode of the second dielectric waveguide along the said second dielectric waveguides; and wherein the perturbation of the evanescent field of the first TE mode of the second dielectric waveguide created by the second secondary dielectric structure being different from the perturbation of the evanescent field of the first TE mode of the first dielectric waveguide created by the first secondary dielectric structure as to create a precise and permanent frequency shift between the two traveling wave resonators.

5. The method of claim 4, wherein at least one of the said first and second secondary dielectric structures is defined from the same material layer as at least one of the said at least two substantially similar dielectric waveguides.

6. The method of claim 1, wherein the said secondary dielectric structure is defined from the same material layer as the said dielectric waveguide.

7. A method of modifying the resonant frequency of a microcavity comprising:

providing a plurality of dielectric microcavities; and introducing a permanent resonant frequency alteration to at least one of the said dielectric microcavity, wherein the permanent resonant frequency alteration has been introduced to at least one of the said dielectric microcavity by lithographically forming a secondary dielectric structure within the optical evanescent field of the said microcavity, said secondary dielectric structure does not come into contact with any of said dielectric microcavities; wherein at least one of the said dielectric microcavities is a dielectric waveguide in a closed loop forming a traveling wave resonator; wherein the secondary dielectric structure is formed along the dielectric waveguide but not in contact with the dielectric waveguide; the secondary dielectric structure being non-guiding for optical frequencies below the cutoff frequency of the second transverse magnetic (TM) mode of the dielectric waveguide; and the secondary dielectric structure being positioned along the dielectric waveguide as to create a substantially equal perturbation of the evanescent field of the first TM mode of the dielectric waveguide, along the dielectric waveguide.

8. The method of claim 7, wherein at least two of the said dielectric microcavities are substantially similar traveling wave resonators formed of substantially similar dielectric waveguides, each of the said dielectric waveguides being arranged in a closed loop; wherein the said secondary dielectric structure is formed along the first of the at least two substantially similar dielectric waveguides but not in contact with any of the said dielectric waveguides; the secondary dielectric structure being non-guiding for optical frequencies below the cutoff frequency of the second transverse magnetic (TM) mode of the first dielectric waveguide; the secondary dielectric structure being positioned along the first dielectric waveguides as to create a substantially equal perturbation of the evanescent field of the first TM mode of the first dielectric waveguides along the said first dielectric waveguides.

9. The method of claim 8, wherein the said secondary dielectric structure is defined from the same material layer as at least one of the said at least two substantially similar dielectric waveguides.

10. The method of claim 7, wherein at least two of the said dielectric microcavities are substantially similar traveling wave resonators formed of substantially similar dielectric waveguides each of the said dielectric waveguides being arranged in a closed loop comprising:

a first of said at least on secondary dielectric structure is formed along the first of the at least two substantially similar dielectric waveguides but not in contact with any of the said dielectric waveguides; the first secondary dielectric structure being non-guiding for optical frequencies below the cutoff frequency of the second transverse magnetic (TM) mode of the first dielectric waveguide; the first secondary dielectric structure being positioned along the first dielectric waveguides as to create a substantially equal perturbation of the evanescent field of the first TM mode of the first dielectric waveguides along the said first dielectric waveguides; and a second of said at least one secondary dielectric structure is formed along the second of the at least two substantially similar dielectric waveguides but not in contact with any of the said dielectric waveguides; the second secondary dielectric structure being non-guiding for optical frequencies below the cutoff frequency of the second TM mode of the second dielectric waveguide; the second secondary dielectric structure being positioned along the second dielectric waveguide as to create a substantially equal perturbation of the evanescent field of the first TM mode of the second dielectric waveguide along the said second dielectric waveguides;

wherein the perturbation of the evanescent field of the first TM mode of the second dielectric waveguide created by the second secondary dielectric structure being different from the perturbation of the evanescent field of the first TM mode of the first dielectric waveguide created by the first secondary dielectric structure as to create a precise and permanent frequency shift between the two traveling wave resonators.

11. The method of claim 10, wherein at least one of the said first and second secondary dielectric structures is defined from the same material layer as at least one of the said at least two substantially similar dielectric waveguides.

12. The method of claim 7, wherein the said secondary dielectric structure is defined from the same material layer as the said dielectric waveguide.

* * * * *